United States Patent [19]
Ha

[11] Patent Number: 5,946,362
[45] Date of Patent: Aug. 31, 1999

[54] APPARATUS FOR DETECTING CLOCK FAILURE FOR USE IN A SYNCHRONOUS TRANSMISSION SYSTEM

[75] Inventor: Jae-Sul Ha, Seoul, Rep. of Korea

[73] Assignee: Daewoo Telecom, Ltd., Incheon, Rep. of Korea

[21] Appl. No.: 08/927,405

[22] Filed: Sep. 10, 1997

[30] Foreign Application Priority Data

Sep. 11, 1996 [KR] Rep. of Korea .................. 96-39373

[51] Int. Cl.⁶ .................................................. H04L 7/00
[52] U.S. Cl. .................... 375/357; 375/354; 371/27.7; 327/41
[58] Field of Search .................... 375/357, 354, 375/226; 371/47.1, 22.36, 27.7, 42; 327/41, 42, 43, 141, 142, 144, 151, 160

[56] References Cited

U.S. PATENT DOCUMENTS

| | | | |
|---|---|---|---|
| 5,005,193 | 4/1991 | Simpson | 377/107 |
| 5,347,523 | 9/1994 | Khatri | 371/22.26 |
| 5,404,363 | 4/1995 | Krause et al. | 371/61 |
| 5,642,069 | 6/1997 | Waite | 327/292 |
| 5,790,609 | 8/1998 | Swoboda | 375/357 |
| 5,818,849 | 10/1998 | Komatsu | 371/22.1 |

*Primary Examiner*—Chi H. Pham
*Assistant Examiner*—Emmanuel Bayard
*Attorney, Agent, or Firm*—Pennie & Edmonds LLP

[57] ABSTRACT

An apparatus for use in a synchronous transmission system, for detecting a failure of a clock signal, which comprises: a reference clock generator for generating a reference clock signal (RCS) in response to a reset signal issued by a system controller in the STS; and means for receiving a clock signal, the RCS issued by the reference clock signal generating means and the reset signal and for producing a failure signal for the received clock signal, wherein the failure represents a state of a clock in which the clock does not have a pulse for a predetermined time interval, the time interval being measured by using the RCS.

3 Claims, 2 Drawing Sheets

APPARATUS FOR DETECTING CLOCK FAILURE FOR USE IN A SYNCHRONOUS TRANSMISSION SYSTEM

FIELD OF THE INVENTION

The present invention relates to a synchronous transmission system; and, more particularly, to an apparatus for detecting clock failure in a synchronous transmission system.

BACKGROUND OF THE INVENTION

As is well known, a synchronous transmission system (STS) is widely utilized to accommodate as many voice/data channels as possible in a given communication path. According to a synchronous digital hierarchy (SDH) recommended by the International Telecommunications Union-Telecommunications Sector (ITU-TS), digital signal level 1 (DS-1) data of the North America or digital signal level 1 data of Europe (DS-1E) is converted to synchronous transport module level 1 (STM-1) data through the use of various data packets of containers, virtual containers, tributary units, tributary unit groups (TUG's) and administrative units, wherein the DS-1and DS-1E data represent 1.544 Mbps pulse code modulated (PCM) serial data having 24 voice channels and 2.048 Mbps PCM serial data containing 32 voice channels, respectively.

In order to efficiently perform the conversion operation, there are generally provided two TUG clock signals in the STS, wherein the two TUG clock signals are of a same predetermined identical clock frequency, e.g., 6 MHz, and one of them is used as a system main clock signal. In a normal condition, the system main clock signal is used for driving the STS and the other TUG clock signal is a stand-by clock. If the system main clock signal is detected to be in failure, the STS immediately replaces the failed TUG clock signal with the other TUG clock signal to continue the conversion process by using the replaced TUG clock signal. In changing the failed TUG clock signal with the other TUG clock signal, a clock failure detector which monitors two TUG clock signals and produces a clock failure signal for each of the TUG clock signals, is used for denoting a changing time.

In one of the conventional clock failure detection schemes, the failure of the TUG clock signal is detected by using a reference clock signal generated from a local oscillator included in the system, that is, the TUG clock signal is considered to be in failure if it is not supplied to the clock failure detector for a predetermined time interval, wherein the time interval is measured by using the reference clock signal generated from the local oscillator and its length depends on performance requirements of the STS.

In another conventional clock failure detection scheme, the failure of a TUG clock signal is detected by using the other TUG clock signal as the reference clock signal, i.e., the predetermined time interval is measured by using the other TUG clock signal.

Since, however, in the first method, providing the local oscillator to the system makes the overall circuit very complex and also exacts a high production cost, because the local oscillator has a crystal resonator, a capacitor, etc., and in the second method, the failures of two TUG clock signals cannot be detected when both of the two TUG clock signals become erroneous at the same time since there will be no proper reference clock working.

SUMMARY OF THE INVENTION

It is, therefore, a primary object of the present invention to provide a more safe, compact and economical clock failure detection apparatus in a synchronous transmission system.

In accordance with the present invention, there is provided an apparatus for use in a synchronous transmission system, for detecting a failure of a clock signal, which comprises a reference clock generator for producing a reference clock signal PCS in response to a reset signal issued by a system controller in the STS and a fail detection device for receiving a clock signal, the RCS issued by the reference clock signal generating means and the reset signal and for producing a failure signal for the received clock signal, wherein the failure represents a state of a clock in which the clock does not have a pulse for a predetermined time interval, the time interval being measured by using the RCS.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
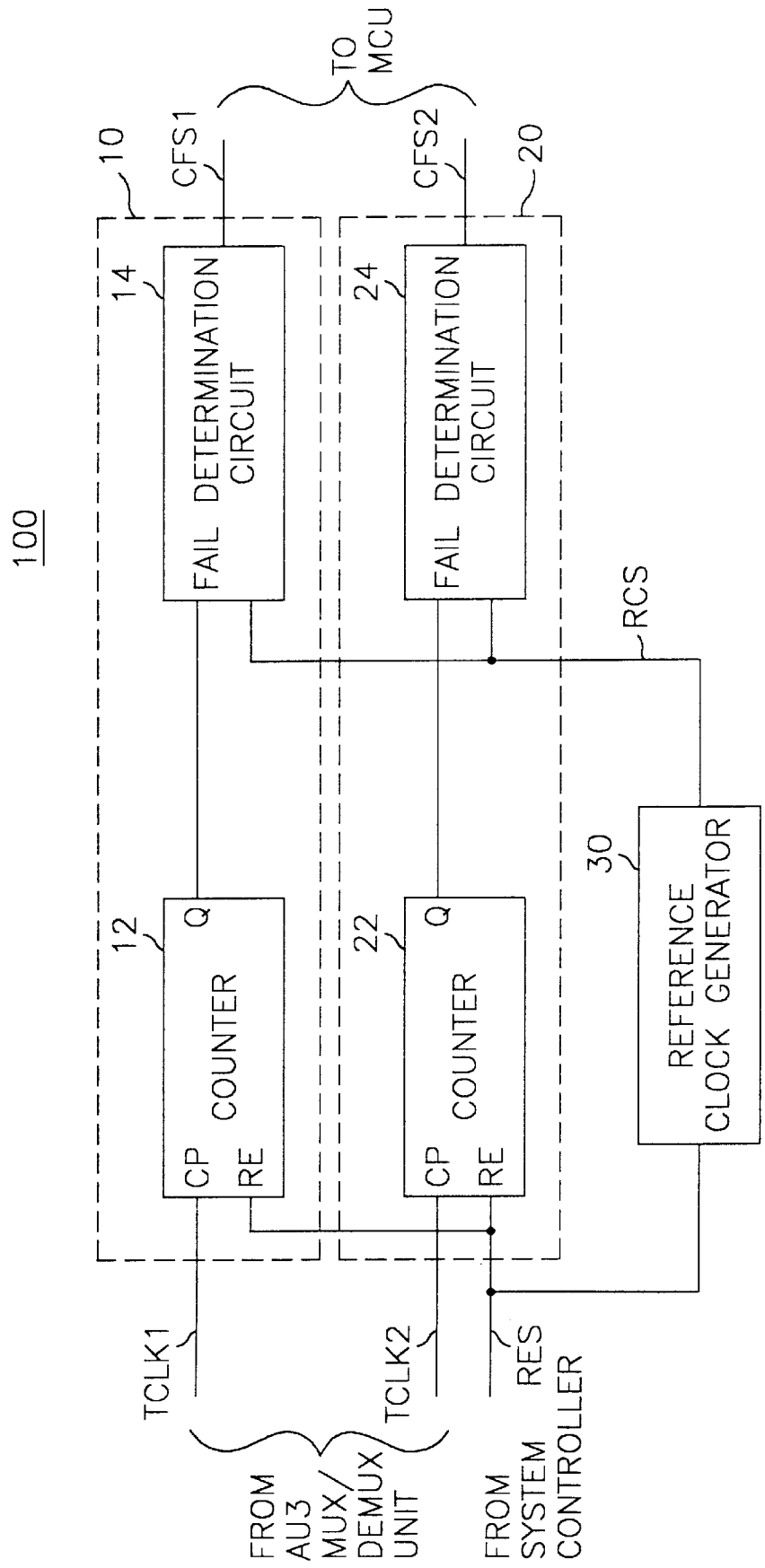
FIG. 1 provides a block diagram of an apparatus for detecting clock failure in accordance with the present invention.

Referring to FIG. 1, there is depicted a block diagram of an apparatus 100 for detecting a clock failure in a synchronous transmission system (STS).

There are provided two TUG clock signals, TCLK1 and TCLK2, in the STS, wherein the clock signals are of a same predetermined identical clock frequency, e.g., 6 Mhz and are produced by an administrative unit 3 multiplexer/demultiplexer (AU3 MUX/DEMUX) unit (not shown) incorporated in the STS. The apparatus 100 in accordance with the present invention comprises a first and a second fail detection devices 10 and 20 and a reference clock generator 30.

As shown in the FIG. 1, the first and the second TUG clock signals TCLK1 and TCLK2 are inputted to the first and the second fail detection devices 10 and 20, respectively, and a reset signal RES generated from a system controller (not shown) is inputted to the first and the second fail detection devices 10 and 20 and a reference clock generator 30.

The first fail detection device 10 which includes a counter 12 and a fail determination circuit 14 receives the first TUG clock signal TCLK1 coupled to a clock pulse Cp terminal of the counter 12 and starts to count the number of, e.g., logic high levels of the clock signal TCLK1, in response to the RES inputted to a reset RE terminal of the counter 12 from the system controller in the STS, wherein the counter 12 may be implemented by using a plurality of flip/flops (F/F's) (not shown) and generates a first clock failure signal CFS1 representing the status of the first TUG clock signal TCLK1. The number of the F/F's depends on performance requirements of the STS. For instance, if the first TUG clock signals TCLK1 having logic high and low levels are continuously supplied to the CP terminal of the counter 12, the counter 12 sequentially counts the number of the logic high levels of TCLK1 and generates a logic high or low signal depending on the counted number to output it through an output port Q thereof, wherein the output port Q is the one associated with a F/F placed at a highest stage among the F/F's in the counter 12. In this case, therefore, the output from the counter 12 will be a pulse train signal having logic high and low levels.

On the other hand, if the pulse train of the first TUG clock signal TCLK1 is not provided to the CP terminal of the counter 12 for a predetermined time period TP while the counting operation is being carried out, the counter 12 retains either a logic high or low signal corresponding to a previously counted number, wherein TP is a positive number and is determined based on the number of the F/F's in the counter 12 and the retained logic high or low signal is maintained and outputted through the output port Q until supply of the first TUG clock signal TCLK1 to the counter 12 is resumed. The output, i.e., the pulse train signal or the logic high or low signal, processed by the counter 12 is then provided, as a first determination reference signal DRS1, to the fail determination circuit 14.

Inputs to the fail determination circuit 14 having a counting device with a plurality of F/F's (not shown) are the DRS1 from the counter 12 and a reference clock signal RCS generated from the reference clock generator 30. The fail determination circuit 14, in response to the inputs applied thereto, selectively produces a logic low or high signal depending on the status of the first TUG clock signal TCLK1, i.e., whether the TCLK1 is normal or not. Specifically, in response to the DRS1 of the pulse train from the counter 12, the fail determination circuit 14 counts the number of the logic high levels of the RCS. Once the counting operation starts in the fail determination circuit 14, it generates a logic low signal indicating that the first TUG clock signal TCLK1 is normal.

On the other hand, in response to the first determination reference signal DRS1 of the logic high or low signal, the fail determination circuit 14 waits for a predetermined tolerance time period TTP, wherein the TTP represents a time interval for which the STS can stably operate based on the first TUG clock signal and is determined on the basis of the number of the F/F's within the fail determination circuit 14, which are prepared according to G. 708 protocol recommended by International Telecommunication Union (ITU).

If the first determination reference signal DRS1 of the pulse train is resupplied to the fail determination circuit 14 after the generation of the logic high or low signal, but before the tolerance time periods TTP is lapsed, it issues the logic low signal denoting that the first TUG clock signal TCLK1 is normal; and if otherwise, it outputs a logic high signal representing that the first TUG clock signal TCLK1 is in failure. The logic high or low signal processed by the fail determination circuit 14 is then relayed as a first clock failure signal CFS1 to a main control unit (MCU) (not shown).

Subsequently, the second fail detection device 20 that includes a counter 22 and a fail determination circuit 24, is essentially identical to the first fail detection device 10 except that it detects a failure of the second TUG clock signal TCLK2; and accordingly, details of the description thereof are omitted here for the sake of simplicity. An output from the counter 22, i.e., a second determination reference signal DRS2, is a pulse train of the logic high and low levels or a logic high or low signal, and that of the fail determination circuit 24 is a second clock failure signal CFS2.

As described above, the fail detection device 10 (20) determines that the TCLK1 (TCLK2) is in failure if the DRS1 (DRS2) from the counters 12 (22) is not sequentially inputted thereto in the time interval of the TTP, wherein the time interval is measured by using the clock signal generated from the reference clock generator 30.

Figure 2:
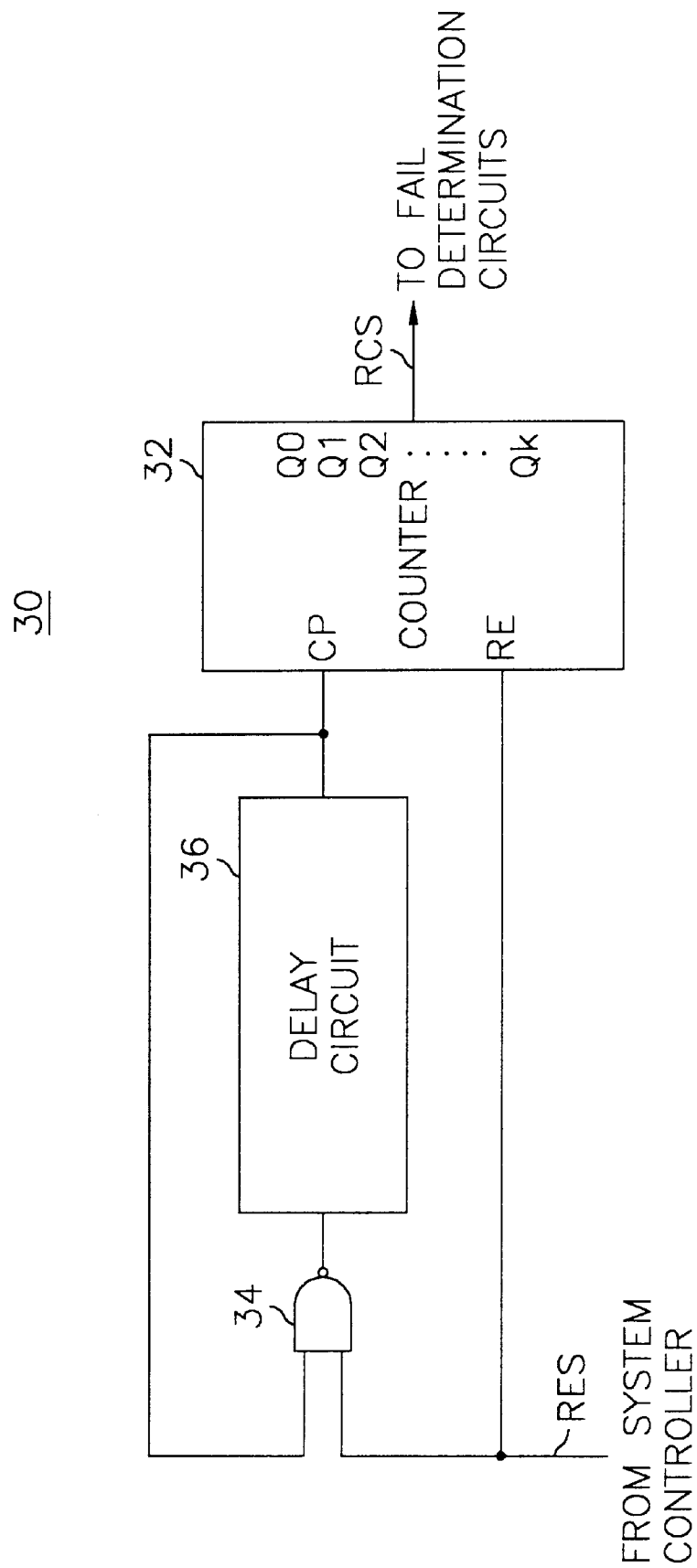
FIG. 2 shows a detailed block diagram of -he reference clock generator shown in FIG. 1.

Referring to FIG. 2, there is illustrated a detailed block diagram of the reference clock generator 30 in FIG. 1, which includes a counter 32, a NAND gate 34 and a delay circuit 36 having several buffers (not shown), wherein the NAND gate 34 has two input terminals and one output terminal.

Input to the reference clock generator 30 is the RES from the system controller. Initially, a state of the RES is a logic low level and an output signal of the NAND gate 34 is logic high regardless the input to the other input terminal. The output signal of the NAND gate 34 representing a logic high level is inputted to the delay circuit 36, and the delayed logic high signal is supplied to the counter 32 and the NAND gate 34. Thereby, the inputs of the NAND gate 34 are the logic high signal from the delay circuit 36 and the RES from the system controller. If the RES signal is a logic low, then the reference clock generator 30 is in a stable state.

In the stable state of the reference clock generator 30, if the RES, switched to the logic high level, provided from the system controller in STS is inputted to the NAND gate 34, then the output signal of the NAND gate 34 becomes logic low. The logic low signal outputted from the NAND gate 34 is provided to the counter 32 and the NAND gate 34 through the delay circuit 36.

In the process of the feedback, i.e., when the output value of the NAND gate 34 is returned to the input terminal thereof after being delayed at the delay circuit 36, the output signal of the NAND gate 34 is alternately repeated between the logic high and the logic low, wherein the interval of the logic high or low level is determined by the number of the buffers in the delay circuit 36, which is used for determining the frequency of the clock. During a repeated processing of the feedback, the signals of the consecutive variation, i.e., the consecutive variation between the logic high level and the logic low level, which is a source clock signal (SCS), are generated.

In the meantime, the counter 32 starts to count the SCS's, in response to the RES. The counter 32 has several output terminals, e.g., Q0, Q1, Q2, . . . Qk, and the output of the each terminal except that of Qk is the pulse train having the logic low and high levels in accordance with the counted value. For example, the output state of the terminal Qo is changed when every second logic high or low level of the SCS is inputted to the counter 32, the output state of the terminal Q1 is changed in every fourth logic high or low level, Q2, in every eighth logic level, and Q(k−1), in every $2^k$th logic level, wherein the k is a positive integer. The output of each output terminal, e.g., Q0, Q1, . . . Q(k−1), is a pulse train having logic high and low levels and a selected one among the outputs of output terminals is provided to the fail determination circuits 14 and 24 as the RCS. When a most significant bit of the counted value, i.e., the output of the terminal Qk, becomes "1", i.e., logic high, the counter 32 is initialized and restarts to count the SCS.

The number of the buffers in the delay circuit 36 and the output of the counter 32 which is provided to the fail determination circuits 14 and 24 as the RCS are determined by the frequency whose period is suitable for measuring the TTP, described above.

The RCS from the reference clock generator 30 is coupled to the fail determination circuits 14 and 24 in FIG. 1 which monitor the state of the TCLK's.

In response to a clock failure signal for any one of the two TUG clock signals, the MCU immediately supplies the other clock signal to the STS so that it can continue to perform its function without being interrupted.

Even though it is not described for the sake of simplicity, it should be appreciated that two or more other clock signals having an identical clock frequency can be also detected whether or not they are in failure, through the use of the same method as in the two TUG clock signals.

Contrary to the prior art, wherein either a local oscillator attached to a main system or one of the two TUG clock signals is used for the reference clock to detect a failure of the TCLK's, thereby resulting in a very complex circuit and a high production cost as described before, the apparatus 100 in accordance with the present invention generates the reference clock signal in response to the RES without an external clock pulse and independent from the TCLK's to detect the failure of the TCLK's, thereby providing a more safe, compact and economical clock failure detection apparatus in the STS.

While the present invention has been shown and described with respect to the particular embodiment, it will be apparent to those skilled in the art that many changes and modifications may be made without departing from the spirit and scope of the invention as defined in the appended claims.

What is claimed is:

1. An apparatus for use in a synchronous transmission system (STS), for detecting a failure of a clock signal, which comprises:

means for generating a reference clock signal (RCS) in response to a reset signal issued by a system controller in the STS; and means for receiving a clock signal, the RCS issued by the reference clock signal generating means and the reset signal and for producing a failure signal for the received clock signal, wherein the failure represents a state of a clock in which the clock signal does not have a pulse for a predetermined time interval, the time interval being measured by using the RCS, wherein the reference clock signal generating means includes:

a NAND gate for receiving a first and a second input and for producing an output signal, said first input being the reset signal issued by the system controller in the STS and said second input being a delayed signal;

means for delaying the output signal from the NAND gate and for producing the delayed signal to provide it as said second input of the NAND gate; and means for counting the delayed signal outputted from the delaying means in response to the reset signal inputted thereto and for producing a pulse train having a logic high and a logic low level based on the counted value to provide the pulse train as a reference clock signal (RCS).

2. The apparatus of claim 1, wherein the receiving and producing means includes:

means for receiving a clock signal in response to the reset signal and producing a failure determination reference signal for said clock signal; and means for generating the failure signal fro the clock signal based on the RCS and the failure determination reference signal.

3. An apparatus for use in a synchronous transmission system (STS), for detecting a failure of a clock signal, which comprises:

a NAND gate for receiving a first and a second input and for producing an output signal, said first input being a reset signal issued by a system controller in the STS and said second input being a delayed signal;

means for delaying the output signal from the NAND gate and for producing the delayed signal to provide it as said second input of the NAND gate;

means for counting the delayed signal outputted from the delaying means in response to the reset signal inputted thereto and for producing a pulse train having a logic high and a logic low level based on the counted value to provide the pulse train as a reference clock signal (RCS); and;

means for receiving a clock signal, the RCS issued by said counting and producing means, and the reset signal and for producing a failure signal for the received clock signal, wherein the failure represents a state of a clock in which the clock signal does not have a pulse for a predetermined time interval, the time interval being measured by using the RCS.

* * * * *